United States Patent [19]
Richard

[11] 3,913,543
[45] Oct. 21, 1975

[54] FUEL HEATING SYSTEM FOR AN INTERNAL COMBUSTION ENGINE

[76] Inventor: Henri Richard, 809 Principale St., St. Thomas de Joliette, Quebec, Canada

[22] Filed: Feb. 20, 1974

[21] Appl. No.: 444,157

[30] Foreign Application Priority Data
Mar. 14, 1973 Canada .............................. 166041

[52] U.S. Cl. ............ 123/122 H; 123/122 E; 165/52
[51] Int. Cl.² ........................................ F02M 31/00
[58] Field of Search ....... 123/122 E, 122 H; 165/52, 165/51

[56] References Cited
UNITED STATES PATENTS

| | | | |
|---|---|---|---|
| 1,226,107 | 5/1917 | Nevillo | 165/52 |
| 1,256,116 | 2/1918 | Dempsey | 165/52 |
| 1,300,600 | 4/1919 | Giesler | 123/122 E |
| 1,318,068 | 10/1919 | Giesler | 123/122 H |
| 1,318,265 | 10/1919 | Clemmensen | 123/122 E |
| 2,228,955 | 1/1941 | Heath | 165/52 |
| 2,989,956 | 6/1961 | Drinkard | 123/122 H |
| 3,253,647 | 5/1966 | Deshaus | 123/122 E |

*Primary Examiner*—Charles J. Myhre
*Assistant Examiner*—R. H. Lazarus

[57] ABSTRACT

A system adapted to heat the fuel fed to an internal combustion engine to produce an improved performance of the latter. A fuel heating system including a heat exchanger adapted to be connected both into the circuit of a fuel line and of at least one engine heated fluid line, such as between the engine and the car heater and/or along the exhaust pipe, a fluid line bypassing the heat exchanger, a thermostatic valve connected to the heat exchanger to regulate the flow of the engine heated fluid through the heat exchanger, and a channel to bypass the car heater when the heater exchanger is connected thereto, to allow the heated fluid to flow through the heat exchanger irrespective of opening or closing of the car heater. Preferably, the system includes one heat exchanger associated to the fluid coolant line and the exhaust pipe to heat the fuel upon starting the engine in the cold and to produce a reduced rate of heating for milder temperature.

5 Claims, 2 Drawing Figures

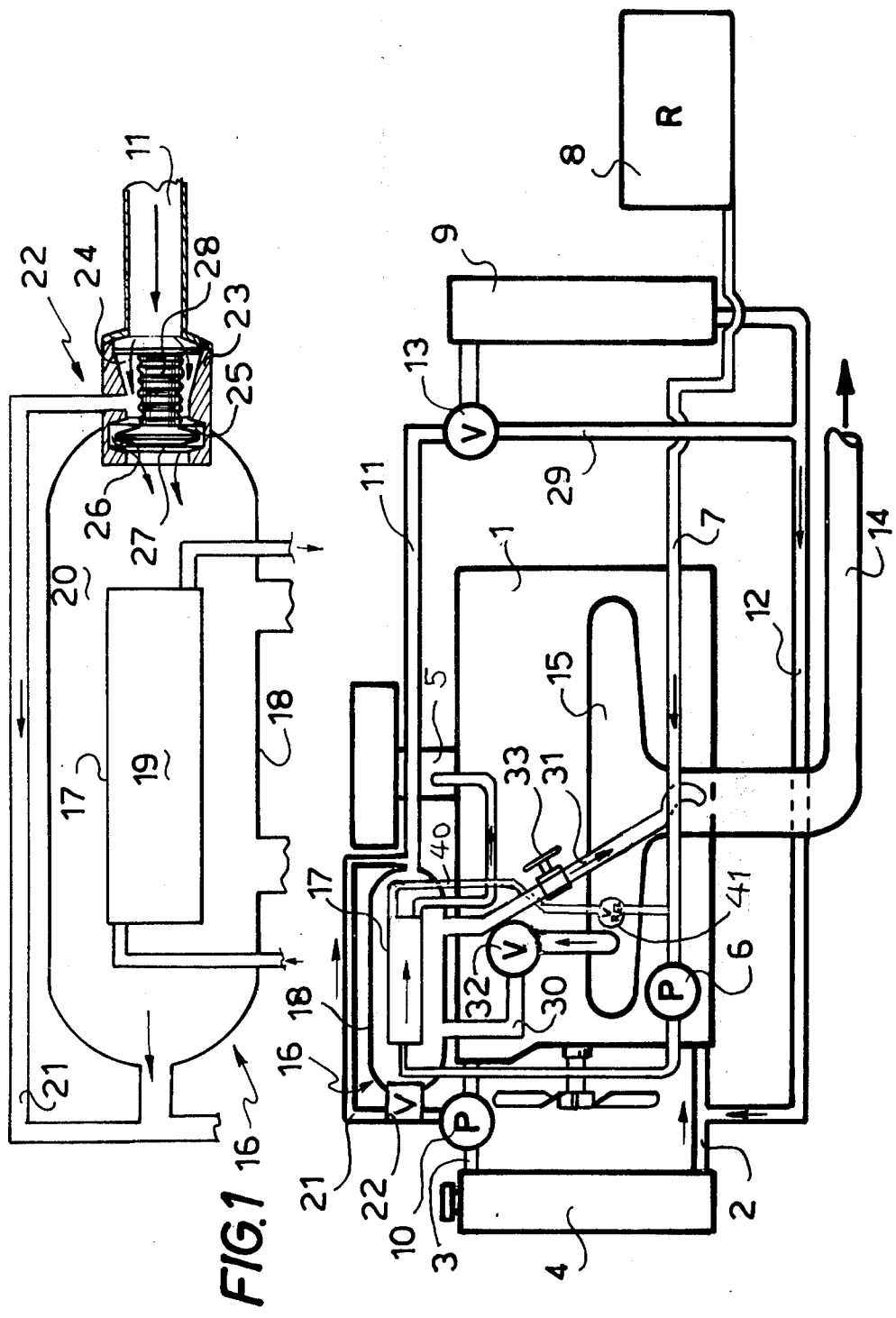

FUEL HEATING SYSTEM FOR AN INTERNAL COMBUSTION ENGINE

This invention relates to internal combustion engines and, more particularly, to a fuel heating system adapted to heat the fuel of such engine before reaching the latter.

It is well known in the field of internal combustion engines that atomization of the fuel into the cylinders is related to the degree of combustion of the fuel and, consequently, to the efficiency of the engine. There also appears to be a relationship between the atomization and volatility of the fuel and the temperature of the latter such that for a fuel at a lower temperature the degree of atomization will be reduce. In any event, it has been noted that the mileage per gallon of fuel may be substantially increased for a vehicle by heating the fuel fed to the internal combustion engine thereof.

A fuel heating system has anteriorly been proposed, which was found to lack control and to allow boiling of the fuel at the higher speeds producing an unreliable performance at those speeds, such as missing of the engine apparently caused by vapor lock into the fuel line.

It is a general object of the present invention to provide a fuel heating system for an internal combustion engine and to thereby improve the efficiency of the latter through allegedly more complete combustion and a resulting better atomization into the cylinder of the engine.

It is another general object of the invention to provide a fuel heating system for the internal combustion engine of a vehicle which system is regulated to prevent boiling of the fuel and the ensuing disadvantageous performance of the vehicle.

It is another object of the invention to provide a fuel heating system for the internal combustion engine of a vehicle which is arranged to operate in the summer as well as in the winter without interfering with the usual car heater.

It is a more specific object of the invention to provide a fuel heating system for an internal combustion engine which is adapted to heat the fuel in the cold and which is also adapted to selectively produce a reduced rate of heating for milder temperature operation.

It is a further object of the invention to provide a heat exchanger which may be connected solely to the heated fluid coolant line through the car heater or, if desired, also to the exhaust system for fiercer heating in the cold.

The invention will now be described in detail with reference to the embodiment thereof which is illustrated, by way of example only, in the accompanying drawings, wherein:

FIG. 1 is a schematic cross-sectional view of a heat exchanger adapted for use into a fuel heating system according to the invention; and FIG. 2 is a schematic view of a fuel heating system according to a preferred embodiment of the invention and including the heat exchanger of FIG. 1.

The preferred fuel heating system according to the invention is particularly adapted to be connected to an internal combustion engine 1, which is cooled by a fluid coolant circulating through the engine and by pipes or tubes 2 and 3, through any conventional radiator 4. The engine 1 is connected to a carburetor 5, of any suitable type, which is fed with fuel by a fuel pump 6 mounted along a fuel line 7 leading from a fuel reservoir 8 to the carburetor 5. In the preferred embodiment, the engine 1 forms part of a vehicle having a vehicle or car heater 9 connected in the usual manner in series with the conventional water pump 10 and the engine with tubes or pipe 11 and 12. A valve 13, of any known type, is arranged to interrupt the flow of heated coolant through the heater 9, such as in summer, by a manual control inside the car or vehicle. An exhaust pipe 14 and a manifold 15 are connected to the engine to evacuate the exhaust gases thereof.

As may have been noted, the afore-described elements 1 to 15 inclusive are anterior to the present invention, which will now be particularly described.

The illustrated invention includes an heat exchanger 16 which includes an inner enclosure 17 and an outer enclosure or shell 18 respectively defining an inner fuel chamber 19 and a surrounding fluid chamber 20. The heat exchanger also includes a fuel inlet and a fuel outlet extending outwardly of the outer shell 18, communicating with the inner fuel chamber 19 and connected in series with the fuel line 7.

The heat exchanger 16 is also provided with a fluid inlet and a fluid outlet communicating with the surrounding fluid chamber 20 and arranged to be connected into the heater coolant line 11. A fluid bypass line 21 is connected at its opposite ends to the heated fluid coolant line 11 to downstream and upstream portions respectively thereof by bypass the heat exchanger 16. A thermostatic valve 22, as shown in detail in FIG 1, is connected to the fluid inlet and forms the upstream junction between the bypass line 21 and the heated coolant line 11 and is adapted to respond to the temperature of the heated fluid into the heater fluid line 11 at the heat exchanger 16.

The thermostatic valve 22 includes a body 23 having an axial passage 24 therethrough and forming axially spaced-apart valve seats 25 and 26. A valve member 27 is mounted between the valve seats 25 and 26 for displacement from one to the other under the action of a temperature responsive bellows or element 28 to which it is secured. The bypass 21 is connected to the body 23 upstream of the valve member 27.

When the temperature of the fluid coolant into the line 11 is too low as in the cold during the winter, the bellows 28 contracts or shortens and the valve member 27 then sits against the valve seat 25. Then the fluid coolant is all diverted through the bypass line 21 and the valve is closed allowing no passage of fluid therethrough in either direction. When the temperature of the same fluid coolant or of the exhaust gases is sufficient, the valve member 27 abuts against the valve seat 26 and still the valve is closed and all the heated fluid coolant is again diverted through the bypass line 21. Between the aforementioned temperatures, the valve member 27 more or less opens the valve 22 and some heated coolant is allowed to flow through the surrounding chamber 20 and heat the fuel into the inner chamber 19. The abovementioned temperatures may be predetermined to close the valve and prevent overheating or vaporization of the fuel fed to the engine.

In the ordinary heating and cooling system of a vehicle or car, the manually controlled valve 13 is more or less closed when full operation of the heater 9 is not desired. For instance, in the summer or warm temperature inside the car, the valve 13 may be completely closed. A bypass pipe or conduit 29 is therefore added to the abovementioned ordinary system, parallel to the car heater 9 through the valve 13 between the fluid lines 11 and 12. The flow of coolant fluid is therefore assured irrespective of the opening and closing of the circuit of heater coolant through the car heater 9.

However, when the engine stands in the cold, as in the winter, it takes some time for the coolant into the cooling system to reach its normal temperature of operation and the fuel is then insufficiently heated. To obviate the above-mentioned disadvantage, it is proposed to supplement the above-mentioned system with heating by the exhaust gases.

For that purpose, the outer shell 18 of the heat exchanger 16 is provided with an exhaust inlet and an exhaust outlet arranged to connect the heat exchanger 16 in series with the manifold 15 through auxiliary pipes 30 and 31 for the flow of the engine heated exhaust therethrough.

Manual valves 32 and 33 are connected to the pipes 30 and 31 such as to be opened in the cold to blow exhaust through the heat exchanger 16 and thereby improve the heating of the fuel. For milder temperatures, the valves 32 and 33 are closed.

As may be easily understood by at least someone skilled in the art, the kind and rating of the conventional components and of the heat exchanger may be selected to suit specific applications.

To further positively prevent vaporized fuel from issuing from chamber 19, a return pipe 40 is connected between the top of chamber 19 and the inlet side of fuel pump 6 with the intermediary of a pressure relief valve 41.

What is claimed is:

1. A fuel heating system for an internal combustion engine comprising a heat exchanger consisting of a fuel chamber and of a heated fluid chamber in heat exchange relation, said fuel chamber having a fuel inlet and a fuel outlet series-connected in the fuel line of an internal combustion engine, said heated fluid chamber having a fluid inlet and a fluid outlet series-connected in an engine heated fluid line connected to an engine for passage of said engine heated fluid therethrough, a fluid bypass line operatively communicating said fluid inlet to said fluid outlet to bypass said heat exchanger, and a thermostatic valve series-connected with said fluid inlet and responsive to the temperature of said engine heated fluid to control the flow of the latter through said heated fluid chamber and through said fluid bypass line, said thermostatic valve including a valve body serially arranged in said fluid inlet and having a pair of valve seats serially arranged in said valve body, a valve member displaceably mounted in said valve body between said valve seats for abutment with either of said valve seats, a heat responsive element located in said valve body to be responsive to the heat of the fluid passing through said valve body, said heat responsive element connected to said valve member to displace the latter into abutment with either of said valve seats in response to the temperature of said fluid, said valve member closing the fluid inlet to the heated fluid chamber below a minimum temperature of the fluid and above a maximum temperature of the fluid, and said valve member opening the inlet when the temperature of said fluid is between said minimum and said maximum temperature, and said bypass line being connected to said valve body upstream of said valve seats and in constant communication with the engine heated fluid line.

2. A fuel heating system as defined in claim 1, wherein said fuel chamber is an inner chamber surrounded by said heated fluid chamber.

3. A fuel heating system as defined in claim 2, wherein said fuel line includes a series-connected fuel pump having an inlet and further including a return line connected to the top of said inner fuel chamber and to the inlet of said fuel pump, and a pressure relief valve series connected to said return line.

4. A fuel heating system as defined in claim 1, wherein said engine heated fluid line constitutes a heated fluid coolant line for a car heater.

5. A fuel heating system as defined in claim 4, further including a fluid bypass channel constructed and arranged to be connected between said fluid outlet upstream of the car heater and the fluid outlet of the latter for bypassing flow therethrough relative to said car heater.

* * * * *